United States Patent [19]

Takeda

[11] 4,098,582

[45] Jul. 4, 1978

[54] METHOD OF ACCELERATING CONTACT REACTIONS IN FLUIDS AND APPARATUS THEREFOR

[76] Inventor: Masahiro Takeda, No. 16-14, 4-chome, Shimouma, Setagaya-ku, Tokyo, Japan

[21] Appl. No.: 730,140

[22] Filed: Oct. 6, 1976

[30] Foreign Application Priority Data

Nov. 14, 1975 [JP] Japan .................................. 50-137074

[51] Int. Cl.² .............................................. C08K 5/17
[52] U.S. Cl. ................................ 23/293 R; 261/79 A; 55/92; 55/235; 55/456
[58] Field of Search ................. 23/293 R, 252 R, 283; 55/92, 257 C, 456, 394, 235, 236, 237, 238; 261/79 A; 239/500, 501, 466, 467, 487, 488, 463, 590, 590.5

[56] References Cited

U.S. PATENT DOCUMENTS

| | | | |
|---|---|---|---|
| 434,119 | 8/1890 | Rutzler | 55/456 X |
| 2,538,195 | 1/1951 | Henkel | 55/456 |
| 3,430,932 | 3/1969 | Kuechler | 55/257 C X |
| 3,440,803 | 4/1969 | Wechselblatt | 55/257 C X |
| 3,605,388 | 9/1971 | Zuiderweg et al. | 55/236 |
| 3,747,856 | 7/1973 | Knapp | 239/590 X |
| 3,775,063 | 11/1973 | Grout et al. | 261/78 A X |
| 3,990,870 | 11/1976 | Miczek | 55/236 X |

*Primary Examiner*—Norman Yudkoff

[57] ABSTRACT

In a method of operating such chemical and physical reactions as oxidation, reduction, absorption, mixing, heat exchanging, deodorizing of a fluid or fluids, an improved method of performing a multi-effect operation of any one of a combination of such chemical and physical reactions with a substantial acceleration effect comprising the steps of passing a fluid mixture of exhaust gases and an absorbent solution under appropriate pressure and flow velocity conditions through a flow deflecting member provided within a reacting area, thereby causing the fluid mixture to flow in an accelerated whirling flow state and to be split into concentrically dual layers of a generally liquid fluid and a generally gaseous fluid under effect of centrifugal force produced from the whirling motion of the fluids, and thereafter directing the dual fluid flows to collide against a plurality of projection members having a special cross-sectional shape, thereby causing the fluid mixture flow to be agitated violently and developing dispersion of fine particles of fluids within the reacting area. This finely dispersed state of the fluid mixture occurs efficiently at the moment of the collision action, splitting and rejoining with each other, resulting in remarkable improvement in the molecular motion within the boundary films of such dispersed fine particles of fluids and reduction of resistance of the boundary films thereof, and increase in a mass transfer rate thereof, whereby eventually there is attained an extraordinary contact efficiency between a gas and a liquid.

9 Claims, 8 Drawing Figures

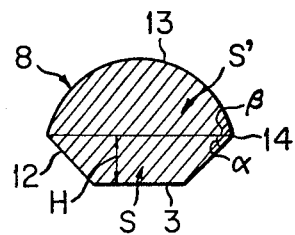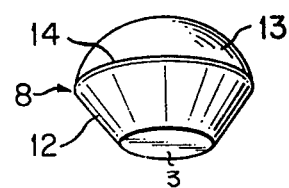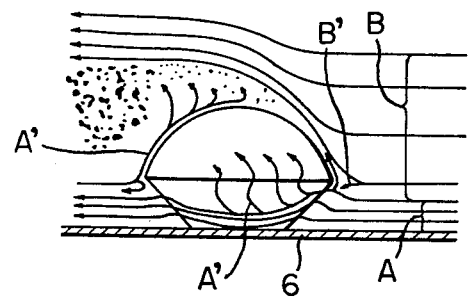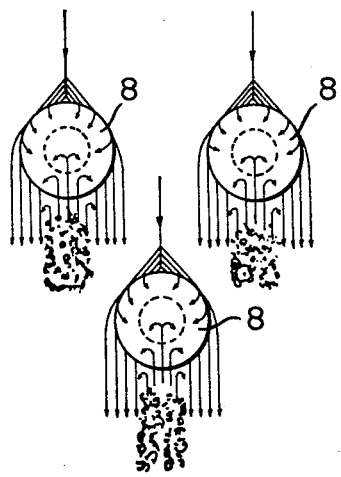

METHOD OF ACCELERATING CONTACT REACTIONS IN FLUIDS AND APPARATUS THEREFOR

BACKGROUND OF THE INVENTION

The present invention relates in general to a method of and an apparatus for improving a contact phenomenon between fluids in liquid and vapor phases, and more particularly to a method of and an apparatus for improving a velocity of such chemical and physical actions as oxidation, reduction, mixing, heat exchanging, etc., of a fluid mixture comprising a gas, a liquid, a fluidized solid and/or a mixture thereof consisting of a single substance, a mixture and/or a compound or compounds thereof having acid or alkaline character.

In the conventional art of improving a contact action in a fluid mixture in a vapor-liquid phase or in a vapor-solid phase, there have been proposed such approaches by applying in horizontal fashion a grid or perforated plate structure, or a tray structure incorporating a layer or layers of packing materials therein, whereby a fluid mixture is converted to a phase of liquid having a gas or gases finely dispersed therein, or whereby a total liquid film area is made greater. However, in order to develop fine gas particles having an average diameter of 1 mm or less, there have been many difficulties encountered in the mechanical or structural design and engineering standpoint, and consequently, a total area of boundary layers wherein a vapor-liquid contact action takes place is inevitably limited to a substantial extent. In practical operation of such apparatus of the conventional art, there would occasionally occur operational troubles or failures of the apparatus caused by clogging within the contact operation arrangement therein from deposit of scales. And furthermore, in general conventional arrangements, the delivery rate of such fluid mixture within a vessel or tower should have been limited to such a low level of 1.5 m/s or so under limited dispersion rate of treating gas fine particles. Under such circumstances, it is a general trend that such reaction apparatus have become a considerably large scale.

SUMMARY OF THE INVENTION

It is therefore a primary object of this invention to provide a unique and useful method of and apparatus for improving a contact action between fluids which can extraordinarily accelerate in a physical manner such contact action between fluids by efficiently enlarging a total contact action area and by promoting development of fluid dispersion for such contact action.

It is another object of this invention to provide a multi-purpose method of and apparatus for accelerating a contact action between fluids which are versatilely applicable to such chemical reactions as desulfurization, denitration, absorption, deodorizing, etc., and also to such physical actions as cooling, heat exchanging, wetting, aeration, etc.

It is still another object of this invention to provide a unique method and apparatus for accelerating a contact action between fluids which is operable with a high follow-up capability under substantial fluid load fluctuations and can attain a good contact efficiency.

It is a still further object of this invention to provide a high efficiency method and apparatus for accelerating a contact action between fluids which is of an extraordinarily simple construction, can be applied with an extrally high fluid velocity, and thus can be made relatively small in size with respect to a volume of a gas or gases to be treated thereby.

It is a further object of this invention to provide a unique method of and apparatus for accelerating a contact action between fluids which is operable with an optimalized balance between a flow drag, and a profile and frictional drag during contact action between fluids so as to minimize deposit of scales onto the components of such apparatus.

The foregoing objects, characteristics, principle, and details of the present invention, as well as further objects and advantages thereof, will become apparent from the following detailed description with respect to a preferred embodiment of the invention, when read in conjunction with the accompanying drawings, in which like parts are designated with like reference numerals.

BRIEF DESCRIPTION OF THE DRAWING

In the drawing:

FIG. 5 is a vertical cross-sectional view of the projection shown in FIG. 2;

FIG. 6 is a perspective view seen obliquely from below of the projection;

FIG. 7 is a schematic view illustrating an aspect of physical effect of the projection effected on the concentrically dual structure of fluid mixture flows within the apparatus according to this invention; and FIG. 8 is a developed plan view schematically illustrating trailing vortexes and turbulences and distribution of fluid flows on the projections arranged in a zigzag fashion which are caused by collision of the fluid flows against the projections.

DETAILED DESCRIPTON OF THE INVENTION

Figure 1:
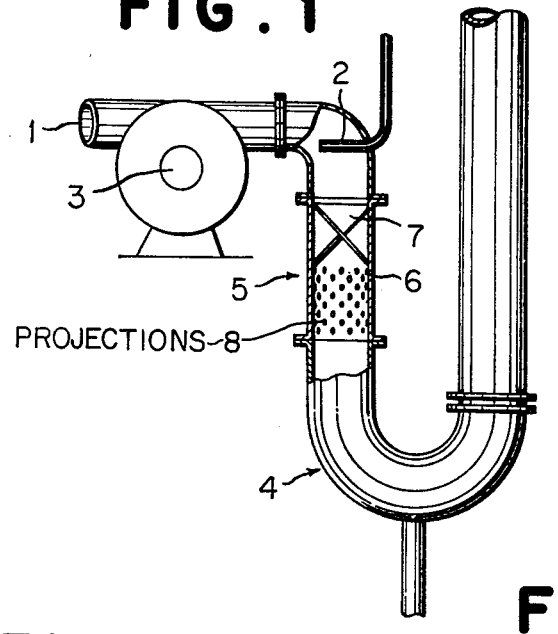
FIG. 1 is a schematic view, partly in section, showing a preferred embodiment of an apparatus for improving contact action between fluids according to the present invention.
Figure 2:
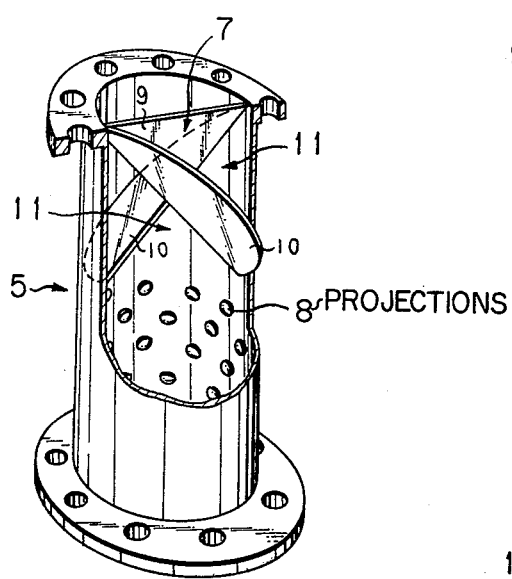
FIG. 2 is a fragmentary enlarged perspective view, partly cut away, showing the interior of the apparatus shown in FIG. 1 incorporating a flow deflecting structure and a plurality of projections according to this invention.
Figure 3:
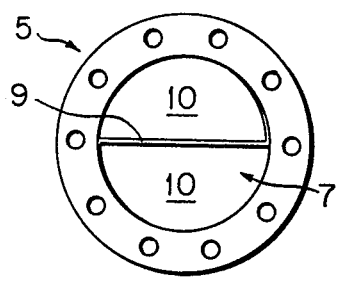
FIG. 3 is a plan view showing the apparatus.
Figure 4:
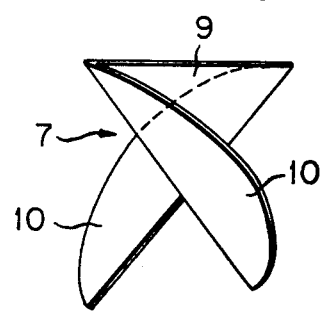
FIG. 4 is an enlarged perspective view of a flow deflecting structure shown in FIG. 2.

The present invention is based on the operating principle which will now be fully described hereinafter.

In various practical operations of such chemical reactions as oxidation, reduction, absorption, deodorizing, etc., or such physical actions of mixing, heat exchanging, wetting, etc., they generally handle a fluid mixture prepared in an appropriate condition to such operations, such as a mixture of fluids having an acid or alkaline character of, for instance, a mixture including at least one gas and at least one liquid or fluidized solid under appropriate flow velocity and pressure conditions.

This invention is directed to the provision of means for deflecting such fluid mixture in a spiral or whirling fashion while passing therethrough so as to develop a gas-liquid dispersion state, and means adapted to collide with flows of said fluid mixture for accelerating or promoting contact action between the fluid particles thus developed from collision action of the fluid mixture thereagainst.

The former means comprises a flow deflecting structure or passageway in a guide vane form for allowing such fluid mixture to pass therethrough under an appropriate flow velocity and pressure condition, the flow deflecting structure being provided intermediately between an inlet and an outlet of the fluid mixture to and from the reacting area, whereby the fluid mixture is caused to be deflected physically in such a manner that it flows spirally or whirlingly down and along the inner wall surface of the flow deflecting passageway with an appropriate directivity, peripheral velocity, inertia force, and pressure gradient, thus causing the fluid mixture flow to be converted to whirling flows of a concentrically multi-layer, or two or three layer structure according to different physical properties which are specific to individual ingredient or component substances contained in the fluid mixture (hereinafter referred to as fluid compositions).

During this step of deflecting action, the aspect of such whirling fluid flows is of a dynamic character, and the phase of distribution of such factors as pressure, peripheral velocity and density of the fluid mixture is dynamically continuous with a certain gradient varying from greater to smaller viewed in a radially inward direction or from a circumferential point toward an axis of a reacting area of tubular configuration.

In this specification, however, it is intended to hypothetically define for clarity and simplicity that thus whirlingly deflected flows of fluid mixture by the flow deflecting means after passing therethrough is now converted or split into generally dual layers of laminar fluid flows of a concentric configuration, i.e., a layer of relatively small density fluid in a radially inward area and a layer of relatively large density fluid in a radially outward area under effect of centrifugal force effected upon thus whirlingly driven flows of the fluid mixture. The former layer is to be construed as a gaseous state of fluids having fine particles of liquid dispersed therein, and the latter layer is to be considered as a liquid state of fluids having fine particles of gas dispersed therein.

The latter means comprises a single projection or a plurality of projections having a special cross-sectional shape securely disposed on the inner wall surface of a cylindrical fluid flowing bed or passageway in a proximal downstream of the flow deflecting structure. The projection is of an obtuse or blunt cross-sectional shape such as convex-headed solid body or annulus shape, and adapted to collide with the above mentioned whirling flows of the fluid mixture, which is now dynamically constantly developed by the above mentioned flow deflecting structure. Also for clarity purpose, description on the operational effect and function of the collision members or projections is to be made with respect to a single piece of members. In this collision action with the projections, the whirling flows of the fluid mixture are caused to be separated physically so that each of dual layers of fluid flows, which may be considered to be dynamically constant, is effectively irritated and agitated according to the profile drag and frictional resistance of the projection, thus allowing the boundary layer between such dual whirling layers of the fluids as hypothetically defined hereinbefore to be positively departed from each other and filled up with turbulences and vortexes in the fluid mixture caused by such collision action against the projection, thus substantial part of thus agitated fluids being inclined to be induced toward the radially inward direction.

By the above mentioned agitating and inducing function of the turbulences and vortexes generated from the collision against the projections and the departure phenomenon in the boundary layer between the whirling flow fluids and the surface defined by the projection of an obtuse cross-sectional shape, the concentric, generally dual structure of the fluid flows is caused to be broken or dissolved so as to develop extrally fine particles of the fluid compositions. At the same time, by further agitating function of reversal and trailing streams of the fluids induced at the rear position of the projections with respect to the fluid flows according to the above mentioned departure phenomenon of the boundary layer, the inside area of the whirling fluid flows is caused to be filled up with the fine particles of the fluid compositions in directions defined by combination of the vertical and horizontal directions with respect to the original or axial direction of the fluid flows.

As generally described above, this invention is directed to increase overall mutual contact areas and number of contact actions of individual particles of the fluid compositions, and at the same time, cause molecular motion of the fluid particles within the boundary film to be excited positively and resistance of the boundary film to be reduced, thereby causing mass transfer velocity to be increased substantially, and eventually resulting in an extraordinary acceleration of contact action between the fluid particles during the process of passing through the reacting area.

Description will now be given on a preferred embodiment of this invention. It is to be understood, however, that the embodiment of this invention, appeared herein is for illustrative purpose only, but not in any way for liminations of the scope and spirit of the invention.

In this embodiment, this invention is, as a typical example of application, adapted to an absorption reaction through contact action either in vapor-liquid phase or vapor-liquid-solid phase wherein desulfurization of sulfur oxides or denitration of nitrogen oxides as contained in exhaust gases of a heavy oil is performed by using alkaline absorbent solution such as caustic soda solution or suspension of calcium hydroxide.

As generally shown in FIG. 1, exhaust gases fed from gas feeding inlet 1 is prepared and wetted with an appropriate quantity of an absorbent solution fed from a liquid supplying nozzle 2 so as to form a fluid mixture. Thus formed fluid mixture is charged with an appropriate flow velocity and pressure into an area of a reacting pipe section 5 constituting a part of a fluid passageway 4 by using positive pressure feed or negative suction feed of such feed means as a blower 3. The reacting pipe section 5 comprises a cylindrical wall member 6 defining the fluid passageway, a flow deflecting structure of a guide vane form 7 disposed within the cylindrical wall member, and a plurality of collision members or projections 8 disposed securely on the inner wall surface or flow bed of the fluid passageway in the downstream of the flow deflecting structure 7 in a predetermined proximate distance therefrom. The projection has, for typical example, a profile of a convex solid body or an annulus shape.

As illustrated in FIGS. 2 through 4, the flow deflecting structure 7 comprises a partition 9 of a triangle shape and two split panels of halfway-cut elliptic shape 10, 10 (hereinafter referred to as split elliptic panels). The partition 9 is of an inverted isosceles or equilateral triangle shape, and disposed wth its base side extending diametrally with respect to the reacting pipe 5 and with its apex pointed to meet with the central axis of the reacting pipe. From the two sides of the equilateral or isosceles triangular partition 9 defining the apex therebetween, there extend the two split elliptic panels 10, 10 in opposite directions or at right angles in symmetrical relationship with respect to the central axis of the cylindrical reacting pipe, respectively, and therefore, their surfaces defined perpendicular to the partition plane are inclined with each other at the apex angle of the partition 9 toward downstream of the fluid flows, and their edges join with the inner or major axis of the ellipse at the above mentioned apex angle. On the outer or circumferential edges, these split elliptic panels 10, 10 are defined to join or merge exactly with the curvature of the inner wall or flowing bed surface of the reacting pipe 5 when the flow deflecting structure 7 is installed in position within the reacting pipe. With such arrangement, the flow deflecting structure 7 provides an organization of like a propeller which effects a function of allowing the fluid mixture fed to the reacting pipe 5 to be divided into two-fractional flows of the fluid mixture of a semi-circular cross-section, and consequently, causing such two split fluid flows to be driven in rotation or whirling motion while passing therethrough downwardly.

The fluid mixture, which is fed under pressure developed by the blower 3 into the area of the above mentioned reacting pipe 5, split by the partition 9 of the flow deflecting structure 7, and caused to pass through flow deflecting passageways 11, 11 defined with an appropriate throttling effect by the partition 9, two split elliptic panels 10, 10 and the flowing bed in the reacting pipe inner wall, is now caused to be driven in rotation or whirling motion and passing through and along the inner wall surface of flowing bed of the reacting pipe are in the direction guided by the split elliptic panels and accelerated with an peripheral velocity as typically represented by: (fluid flow rate ÷ minimum cross-sectional area of flow deflecting passageway opening) (m/s), and with such centrifugal acceleration as typically represented by: {(peripheral velocity)$^2$ ÷ effective radius of reacting pipe} (m/s). Consequently, according to difference in mass, density and viscosity specific to the individual fluid compositions, there occurs separation of the fluid mixture into generally dual layers of whirling flows of concentric shape as hypothetically defined hereinbefore, i.e., a layer of fluids A having gas finely dispersed therein (hereinafter referred to as gas-in-liquid fluid A) and a layer of fluids B having liquid finely dispersed therein (hereinafter referred to as liquid-in-gas fluid B), in the direction of radial inward from the flowing bed or inner wall surface toward the axis of the reacting pipe 5 as schematically shown in FIG. 7. In this dual layers of concentric flows of the fluid mixture, the liquid-in-gas fluid B existing in the area nearer the axis of the reacting pipe is caused to be driven in whirling motion with a higher velocity than that of the gas-in-liquid fluid A existing in the radially outward area or around the flowing bed area of the reacting pipe.

The thickness of such layer of whirling fluid flows measured from the flowing bed of the reacting pipe is (provided that neglected are the viscosity, density and mass of the gas-in-liquid fluid and the vertical cross-sectional areas and volumes of the collision members 8) represented by a radial distance of a remaining annular area from the inner circumference or wall surface of the reacting pipe, which remaining area is obtained from subtraction from the reacting pipe effective cross-sectional area of an area occupied in concentric relationship by an annular area that remains from subtraction of a minimum opening cross-sectional area of the flow deflecting passageway from the reacting pipe effective cross-sectional area, i.e., represented by:

$$D\{1 - (1 - 2/x \cdot \tan \theta)^{0.5}\}12$$

where $D$ designates a diameter of the reacting pipe; and $\theta$ designates an angle of inclination of the split elliptic panels with respect to the reacting pipe.

The whirling flows of the fluid mixture of dual concentric structure thus formed is then caused to flow into and collide against the above metioned plurality of projections or collision members 8 which are provided on the flowing bed following in the downstream of the flow deflection passageway. The cross-sectional shape of the collision member 8 is preferably of a special one, as schematically shown in FIGS. 5 and 6, which is of a solid body having a convex or generally semi-spherical head portion on an inverted frustoconical body portion.

However, it is to be understood that any other shapes of solid bodies, for instance, an inverted tetragonal pyramid, or a polygonal column or prism, or a projection of annulus shape provided with a circular shoulder or edge, may be applied in a place of the above mentioned special shape, only if such projections provide a throttling effect on a fluid flow, and furthermore, operational functions as further described hereinafter.

In more detail, a typical example of the configuration of the collision member or projection 8 is such, as shown in FIGS. 5 and 6, that it comprises an inverted frustoconical body portion having different top and bottom cross-sectional areas 12 (hereinafter referred to as a frustoconical body portion) and having such appropriate dimensions with respect to the whirling fluid mixture flows as a vertical projected area S, a horizontal projected area S', a body height H, and an angle of upgrade $\alpha$, and an upper or head portion of convex or generally semi-spherical shape 13. A plurality of such collision members 8 are arranged fixedly on the inner wall surface of the reacting pipe area in the proximate downstream of the above mentioned flow deflecting passageway in a suitable arrangement, preferably in a zigzag fashion, so as to receive or project against the whirling flows of the fluid mixture with successive and even chances of collision.

For more detail of the configuration, the body portion 12 of the collision member 8 of an inverted frustoconical shape is designed with an appropriate angle of downgrade $\alpha$ which is adapted to adjust a balance factor (tan $\alpha$) to be obtained between a drag, i.e., {(drag coefficient × specific weight × peripheral velocity$^2$ × vertical projected area) ÷ (2 × gravitational acceleration)} (kg), and a lift, i.e., {(lift coefficient × specific weight × peripheral velocity$^2$ × horizontal projected area) ÷ (2 × gravitational acceleration)} (kg), the above mentioned drag and lift being generated, respectively, according to the vertical and horizontal projected areas of the collision member with respect to the above mentioned gas-in-liquid fluid A which trends to flow in close proximity to or in contact with the flowing bed of the reacting pipe area. Furthermore, the collision member is designed with a height which is higher than the thickness of the hypothetical layer of the gas-in-liquid fluid A, and which is adapted to allow a part of the gas-in-liquid fluid to be induced by the peripheral flow velocity therearound enough to climb upwardly or flow upstream onto the upper semi-spherical portion 13 of the collision member 8 so as to form a boundary layer thereon.

On the other hand, the upper convex portion 13 of the collision member 8 is designed in, for instance, a semi-spherical shape having an angle of upgrade $\beta$ as illustrated in FIG. 5 so as to cause a boundary layer formed on the semi-spherical surface to be departed therefrom by collision action developed between gas-in-liquid fluid A and liquid-in-gas fluid B which is in a whirling state above or radially inwardly of the gas-in-liquid fluid A, and so as to promote the formation of reversal and trailing streams resulted from the above mentioned departure phenomenon.

When a plurality of collision members 8 having the above mentioned shape are provided in the passageway in the downstream of the flow deflecting structure 7 in the predetermined generally zigzag fashion as mentioned hereinbefore, there occurs successive collision with the generally dual concentric layers of the whirling flows of the fluid mixture generated by the flow deflecting structure in the manner as schematically shown in FIG. 7. With the provision of such design shape and arrangement of the plurality of collision members 8 in the passageway of the concentric layers of whirling fluid mixture as described in detail hereinbefore, there efficiently occurs successive collision actions of the whirling fluid mixture thereagainst. Since the collision member 8 of an obtuse shape as mentioned above is designed with a vertical height and with vertical and horizontal projected areas and a volume which are optimally selected with respect to the flow rate, peripheral velocity and pressure of the gas-in-liquid fluid A in accordance with the physical properties of the fluid compositions thereof, the lower frustoconical portion 12 of the collision member having an asymmetrical profile with respect to the vertical axis thereof collides with the major part of the gas-in-liquid fluid A at its front area with respect to the fluid A flows, thus causing the gas-in-liquid fluid A to be split to generally vertical directions with appropriate angles of inclination as schematically shown in FIG. 7, and causing the interior of the gas-in-liquid fluid A to be irritated and agitated dynamically, like in a phenomenon where turbulent fluctuations is caused by a series of stakes projecting in a river stream, thereby resulting in partly stagnant and elevated or swollen off-streams of the gas-in-fluid A, and eventually developing a higher relative velocity between gas-in-liquid fluid A and liquid-in-gas fluid B. Furthermore, by function of lift and drag balance developed therefrom, a part A' of the gas-in-liquid fluid A is induced to climb upwardly and flow upstream onto the semi-spherical portion 13 and have thus-formed boundary layer kept existing thereon, thus remarkably increasing a total area of flowing bed surfaces wetted with the liquid particles induced thereto during collision action against the collision member 8. On the other hand, in a circumferential edge portion 14 at a junction between the lower frustoconical body portion 12 and the upper semi-spherical portion 13 of the collision member 8, there is formed an appropriate circumferential corner defined includedly between the angles $\alpha$ and $\beta$, and also this circumferential edge or corner portion is positioned at an appropriate height permitting contact with the hypothetical layer of liquid-in-gas fluid B generally existing above or in a relatively radially inward position than that of the gas-in-liquid fluid A. Consequently, there occurs efficient collision action of the gas-in-liquid fluid A with the liquid-in-gas fluid B, thereby effecting to generally reform the layer of the liquid-in-gas fluid B in a direction which is generally parallel with that of the following bed.

According to the above mentioned configuration, the collision member 8 functions, on one hand, to induce the momentum of a minor part B' of the liquid-in-gas fluid B whirling at a higher velocity than that of the gas-in-liquid fluid A into the area of the lower frustoconical body portion along the wall surface thereof inclined at the angle $\alpha$, thereby promoting the development of a balance state of the lift and drag in the gas-in-liquid fluid so that such development of lift and drag serves together to promote upward climbing and upstream flowing tendency of the gas-in-liquid fluid A onto the upper semi-spherical portion 13 so as to dynamically maintain a constant boundary layer formation thereon, and on the other hand, to induce the momentum of a part of the liquid-in-gas fluid B into an area to flow nearer the semi-spherical portion 13 at the angle of upgrade $\beta$ so that a film of the gas-in-liquid fluid A dynamically constantly formed on the above mentioned semi-spherical portion 13 is caused to be excited by departure of the boundary layer occuring from collision action between the liquid-in-gas fluid and the surface of the semi-spherical portion, and violently inducing and agitating functions of turbulent and reversal streams and subsequently developed trailing streams caused from that departure of the boundary layer (see FIG. 8), thus causing the film of the gas-in-liquid fluid on the surface of the semi-spherical portion to be atomized efficiently to numberless extra fine particles, whereby there are uninterruptedly materialized an idealistic state of such phenomena as generation, collision, excitation, unionization, and distribution of thus formed fluid particles.

Such phenomena are kept occurring dynamically constantly by function of the plurality of collision members arranged suitably on the flowing bed of the cylindrical reacting area, subsequently the interior of the whirling flow of the fluid mixture is efficiently filled up with atomized fine particles of liquid. Molecular motion within the boundary film of the fluid particles which are atomized in such state of violently whirling and turbulent flows is now extraordinarily activated therein, whereby a resistance in the boundary film of the fluid particles is remarkably reduced.

By virtue of extraordinary high efficiency phenomena as materialized by the apparatus and method according to this invention, the rate of mass transfer increases remarkably, and consequently, the velocity of reaction is accelerated extraordinarily, as described later in an exemplary experiment using a pilot plant embodying this invention.

Although detailed description was exclusively directed to a preferred embodiment of this invention which incorporates a single unit comprising a flow deflecting structure and a plurality of collision members, as readily appreciated by those skilled in the art, it is of course feasible to provide a plurality of such units arranged in series succession within the reacting area without any deviation from the spirit and scope of the present invention. Also, it is possible to arrange the above mentioned single unit or plural units in the lateral or parallel fashion without any substantial affection in the performance, whereby the use of the apparatus can be advantageously extended where so required. Moreover, the above mentioned unit or units may be applied in horizontal arrangement without any substantial change in its performance.

The following experimental results are presented to typically illustrate in more detail the advantageous features materialized in practice of the present invention. However, as it is apparent that numerous changes and variations can be made in practicing the invention, the scope and spirit of the invention is defined by the claims and is not to be construed being limited to the particular materials and conditions applied in the exemplary experiment presented expressly herein.

A series of experiments was conducted on pilot plant incorporating a single pipe construction having an overall length of 3.9 meters which comprises three units of reacting pipe assembly according to this invention arranged in series relationship therein, each unit having the dimensions of an approximately 31 cm inner diameter and a 68 cm length. With this pilot plant, cooling, dust removing, desulfurization and denitration on exhaust gases from combustion of a heavy oil were performed simultaneously in a continual operation.

| | |
|---|---|
| Exhaust gas flow volume | 3,403 $Nm^2/h$ |
| Superficial velocity of gases in reacting column | 15 m/s |
| Peripheral velocity of gases in reacting column | 23.55 m/s |
| Process time of gases in reacting column | 0.26 s |
| Ratio of gas/liquid (weight) | 4 |
| Pressure drop | 320 mmAq |
| Temperature of exhaust gases | |
|   Reacting area, inlet | 250° C |
|   Reacting area, outlet of 1st stage | 55° C |
| $SO_2$ Removing | |
|   Concentration at reacting area, inlet | 1500 ppm |
|   Concentration at reacting area, outlet | 2.3 ppm |
|   Ratio of desulfurization | 99.85% |
| $NO_x$ Removing | |
|   Concentration at reacting area, inlet | 200 ppm |
|   Concentration at reacting area, outlet | 61.6 ppm |
|   Ratio of denitration | 72.0% |
| Dust removing | |
|   Weight quantity at reacting area, inlet | 0.5 $g/Nm^3$ |
|   Weight quantity at reacting area, outlet (without demister) | 0.09 $g/Nm^3$ |
|   Ratio of dust removing | 82.0% |

In the experiment illustrated above, a mixture of 5% solutions of alkalizing and oxidizing agents of approximately equivalent mol, respectively, was sprayed from a single spraying nozzle which is disposed at the top of the reacting pipe section against $SO_2$ and $NO_x$ components contained in the exhaust gases bed at the inlet to the reacting area.

When the flow rate or volume of the exhaust gases was reduced down to a level of 1,000 $Nm^3/h$, the ratios of desulfurization and denitration did not show any substantial change. The concentration values of $SO_2$ and $NO_x$ were measured by using flue-gas detector of ultraviolet absorption type, and the quantity of dusts and soots was measured by way of the filter paper thimble method according to the Japanese Industrial Standards, Z-8808.

It generally seems to be practically impossible to operate the reactions of desulfurization and denitration simultaneously by spraying mixed solution of alkalizing and oxidizing agents from a single spraying nozzle as performed in this experiment. However, in this reacting apparatus, it has been recognized repeatedly in a series of experiments that among the part of chemical reactions occuring in this apparatus, desulfurization completed substantially in a time of such an order of 0.08 second, while denitration took approximately 0.26 second as this step of reaction is controlled by NO oxidation, and it is considered that this step of nitration occurs through absorption and reduction of $NO_2$ with sulfite developed in the step of desulfurization and with water.

On the other hand, with respect to the step in which the exhaust gas temperature of 250° C at the inlet of the reacting area could be reduced to the level of 55° C within 0.045 second by using the recycling solution having the liquid-gas ratio of 4 or so and the temperature of 55° C, it is considered that most part of water content at the temperature of 20° C as a solvent of alkalizing and oxidizing agents was converted to water vapor at the temperature of 55° C within 0.045 second.

Incidentally, the above mentioned experimental results is of a case in which the reacting apparatus according to this invention was applied to the operation wherein desulfurization and denitration occurred substantially simultaneously. In the case wherein desulfurization only was performed, the ratio of desulfurization was 99.95%. In summary, it was found from the series of experiments that it is uniquely advantageous in acceleration of such multi-effect reactions to deflect the flows of fluid mixture, and thereafter split thus deflected flows for violent agitation in the physical manner as stated hereinbefore. As fully discussed above, it is now apparent that the present invention can provide an efficient solution in acceleration of various contact reactions with a relatively simple construction and within an extraordinary short period, free from any substantial reduction in the reaction efficiency within fluctuations of loads during operation, and moreover, this invention can provide a flexible follow-up operability with as high as 8 to 1 or more threshold ratio of load fluctuations. By virtue of such advantageous features of this invention, it is now feasible to attain a substantial economization and rationalization in various contact reactions in comparison with the prior art. Although detailed descriptions have been made exclusively on the foregoing typical embodiment of this invention, it should be understood, as indicated hereinbefore, that the preferred embodiment as described and shown herein do not mean in any way limitations of this invention thereto, but on the contrary, many changes, variations and modifications with respect to the construction and arrangement in practice thereof may further be derived by those skilled in the art of which the present invention pertains, whereby 200 further the advantageous characteristics of this invention may be realized without departing from the spirit and scope of the invention as set forth hereunto in the appended claims.

What is claimed is:

1. An apparatus for facilitating reaction in a fluid mixture having gas and liquid constituents comprising:
   a fluid conduit;
   means for imparting circular motion to fluid passing through the conduit to form at least two concentric layers including a radially outer, substantially liquid layer and a radially inner, substantially gaseous layer; and,
   a plurality of projections on a radially inner wall of said conduit, said projections having a relatively smaller cross-sectional area in a plane adjacent the wall and normal to a radial, than in a plane radially inwardly displaced from the wall and normal to the radial; whereby said projections disperse fine liquid particles in the substantially gaseous layer.

2. The apparatus of claim 1 wherein the relatively smaller cross-sectional area is located in the radially outer layer of the fluid passing through the conduit.

3. The apparatus of claim 1 wherein said projections have a convex, radially inwardly facing surface which is covered by a film of fluid from the radially outer layer.

4. The apparatus of claim 1 wherein said projections are located in a staggered arrangement on the inner surface of said conduit.

5. The apparatus of claim 1 wherein said projections each include:

a frustra-conical portion having a principal axis oriented radially to said conduit, the smaller of the generally circular faces of the frustra-conical portion contacting the inner wall of the conduit; and, a convex portion extending from the larger of the generally circular faces of the frustra-conical portion.

6. The apparatus of claim 5 wherein the convex portion is semi-spherical in shape.

7. The apparatus of claim 1 wherein said motion imparting means includes:

a triangular partition panel disposed in a plane generally parallel to the direction of flow of fluid entering the conduit and having a base edge thereof lying generally along a diameter of the conduit; and, two planar panels each having a truncated elliptic shape, each having a generally straight edge disposed along a side edge of said triangular partition and each having an edge in the shape of a truncated ellipse disposed along an inner wall of the conduit.

8. A method for dispersing one fluid in another fluid of different density comprising the steps of:

passing a mixture of the fluids through a fluid conduit;

imparting a circular component to the motion of the fluid mixture through the conduit thereby at least partially separating the fluids of different density into concentric layers; and, disposing projections on an inner wall of the conduit, dimensioned and configured so that fluid in a radially outer layer is induced to form a film on a radially inner surface of the projection in dynamic contact with fluid in a radially inner layer.

9. The method of claim 8 wherein the fluid includes a gaseous component and a liquid component; and wherein the gaseous component and the liquid component are at least partially separated into layers, the liquid component layer being located radially outward of the gaseous component layer and moving at a relatively lower angular speed than the gaseous component layer.

* * * * *